United States Patent
Hechenberger et al.

(10) Patent No.: US 11,104,265 B2
(45) Date of Patent: Aug. 31, 2021

(54) LIGHTING DEVICE FOR A MOTOR VEHICLE HEADLIGHT

(71) Applicant: ZKW Group GmbH, Wieselburg (AT)

(72) Inventors: Josef Hechenberger, Mondsee (AT); Bernhard Mandl, Ober-Grafendorf (AT); Jürgen Zorn, Rossatz (AT); Riepl Kevin, Eferding (AT)

(73) Assignee: ZKW GROUP GMBH, Wieselburg (AT)

( * ) Notice: Subject to any disclaimer, the term of this patent is extended or adjusted under 35 U.S.C. 154(b) by 0 days.

(21) Appl. No.: 16/755,798

(22) PCT Filed: Sep. 13, 2018

(86) PCT No.: PCT/EP2018/074782
§ 371 (c)(1),
(2) Date: Apr. 13, 2020

(87) PCT Pub. No.: WO2019/076550
PCT Pub. Date: Apr. 25, 2019

(65) Prior Publication Data
US 2021/0162910 A1    Jun. 3, 2021

(30) Foreign Application Priority Data

Oct. 19, 2017  (EP) ..................................... 17197220

(51) Int. Cl.
*B60Q 1/00* (2006.01)
*F21V 8/00* (2006.01)
*B60Q 1/04* (2006.01)
*F21S 41/24* (2018.01)
*F21S 41/32* (2018.01)

(52) U.S. Cl.
CPC .............. *B60Q 1/0011* (2013.01); *B60Q 1/04* (2013.01); *F21S 41/24* (2018.01); *F21S 41/32* (2018.01);
(Continued)

(58) Field of Classification Search
CPC ......... B60Q 1/0011; B60Q 1/04; F21S 41/24; F21S 41/32; G02B 6/0045; G02B 6/0055
(Continued)

(56) References Cited

U.S. PATENT DOCUMENTS 7,513,654 B2 *   4/2009   Okada .................... F21S 41/143
                                                     362/297
9,188,298 B2 *  11/2015   Ohno ..................... F21S 41/322
(Continued)

FOREIGN PATENT DOCUMENTS

CN        105716023 B      6/2016
DE     102011009100 A1    3/2012

OTHER PUBLICATIONS

Search Report for European Patent Application No. 17197220, dated Apr. 5, 2018 (1 page).
(Continued)

*Primary Examiner* — Bryon T Gyllstrom
(74) *Attorney, Agent, or Firm* — Eversheds Sutherland (US) LLP

(57) ABSTRACT

The invention relates to a lighting device for a motor vehicle headlamp, comprising a primary optical element (100) which is arranged in the main beam direction of a first light fixture (50) and which has a light coupling-in surface (110) for coupling in light into the primary optical element (100), a light coupling-out surface (120) as well as a lateral surface which extends between the light coupling-in surface (110) and the light coupling-out surface (120) and on which the light coupled in can be relayed by total reflection in the direction of the light coupling-out surface (120) of the primary optical element (100), a secondary optical element (200) which is arranged after the light coupling-out surface (120) of the primary optical element (100) and which has a light coupling-in surface (210) and a light coupling-out surface (220), and an arranged reflector (400, 410, 420), the
(Continued)

Figure 1:
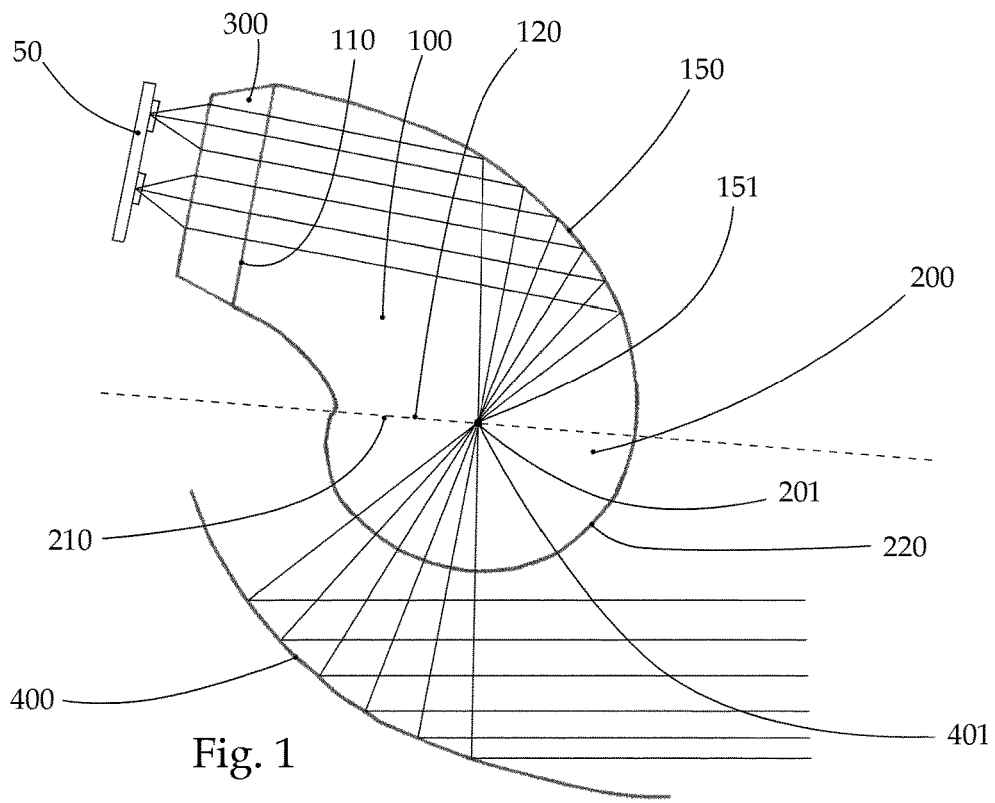

secondary optical element (200, 250, 500) being designed as part of a quadric, the secondary optical element (200, 250, 500) being configured to guide the light beams on the reflector (400, 410, 420) by means of refraction or let the light beams pass without a change of direction during coupling, which light beams are emitted by the first light fixture (50) and reach the light coupling-out surface (220, 270, 520) of the secondary optical element (200, 250, 500).

20 Claims, 6 Drawing Sheets

(52) U.S. Cl.
CPC ......... *G02B 6/0045* (2013.01); *G02B 6/0055* (2013.01)

(58) Field of Classification Search
USPC .......................................................... 362/511
See application file for complete search history.

(56) References Cited

U.S. PATENT DOCUMENTS

| | | | | |
|---|---|---|---|---|
| 10,139,646 | B2* | 11/2018 | Gromfeld | G02B 27/30 |
| 2005/0180158 | A1* | 8/2005 | Komatsu | F21V 7/0091 |
| | | | | 362/545 |
| 2005/0201114 | A1* | 9/2005 | Komatsu | F21S 41/155 |
| | | | | 362/509 |
| 2006/0087860 | A1* | 4/2006 | Ishida | F21S 41/155 |
| | | | | 362/517 |
| 2007/0037906 | A1 | 2/2007 | Kawato et al. | |
| 2008/0278961 | A1* | 11/2008 | Cunnien | F21S 41/322 |
| | | | | 362/516 |
| 2009/0073710 | A1* | 3/2009 | Sormani | F21S 41/143 |
| | | | | 362/509 |
| 2012/0140481 | A1* | 6/2012 | Simchak | F21S 43/14 |
| | | | | 362/296.07 |
| 2013/0188377 | A1* | 7/2013 | Konishi | F21S 41/323 |
| | | | | 362/511 |
| 2014/0003071 | A1* | 1/2014 | de Lamberterie | F21S 43/14 |
| | | | | 362/487 |
| 2015/0023037 | A1 | 1/2015 | Bauer et al. | |
| 2017/0184267 | A1* | 6/2017 | Courcier | G02B 6/0055 |
| 2019/0003675 | A1 | 1/2019 | Kuwata et al. | |

OTHER PUBLICATIONS

International Search Report for PCT/EP2018/074782, dated Dec. 19, 2018 (2 pages).

* cited by examiner

LIGHTING DEVICE FOR A MOTOR VEHICLE HEADLIGHT

The invention relates to a lighting device for a motor vehicle headlight comprising
- a light-guiding primary optical element, which is arranged in main emission direction of a first light fixture and which, on a side facing the first light fixture, has a light coupling-in surface for coupling light beams into the primary optical element, a light coupling-out surface on a side facing away from the first light fixture as well as a lateral surface extending between the light coupling-in surface and the light coupling-out surface, on which the coupled-in light can be relayed through total reflection in direction of the light coupling-out surface of the primary optical element,
- a secondary optical element arranged in light emission direction after the light coupling-out surface of the primary optical element, which comprises a light coupling-in surface on a side facing the light coupling-out surface of the primary optical element and a light coupling-out surface on a side facing away from the primary optical element, and
- a reflector arranged in light emission direction after the light coupling-out surface of the secondary optical element and provided for generating a light distribution or a partial light distribution of a light function.

Furthermore the invention relates to a motor vehicle headlight with at least one above-mentioned lighting device.

Normally a motor vehicle headlight can generate a number of light functions. These include for example a dipped-beam function and a full-beam function, wherein these functions have to meet legal requirements. These light functions generally encompass one light distribution or a number of partial light distributions.

The light sources used are, among others, LEDs, which due to the respective superstructures/lighting devices for generating the dipped-beam function and the full-beam function are arranged on separate printed circuit boards.

In order to generate these determined light functions, it may be necessary to deflect the emitted light beams of one or more LEDs via a deflecting optical body onto a reflector.

This requires making sure that as little light power/light intensity as possible gets lost during the deflecting process.

It is a requirement of the invention to further develop a lighting device in such a way as to improve the degree of efficiency for generating a light function.

This requirement is met in that the secondary optical element is designed as part of a quadric, wherein the secondary optical element is configured to guide the light beams, which have been emitted by the first light fixture and reach the light coupling-out surface of the secondary optical element, during coupling-out onto the reflector by means of refraction, or to let them pass unrefracted.

This may including providing for the secondary optical element/the light coupling-out surface of the secondary optical element to be shaped convexly, i.e. to be arched outwards.

In three dimensions a quadric as a rule defines a surface in space, which is also called a second order surface or square surface.

Examples of a three-dimensional quadric are a (double-skin) hyperboloid, ellipsoid, (hyperbolic) paraboloid, cylinder, elliptical paraboloid and a cone.

As a rule quadrics comprise three-dimensional curved surfaces, wherein degenerated quadrics comprise linear structures in some directions, such as for example a cylinder in direction of its height or a cone starting from a point of the base surface along the lateral surface in direction of the tip of the cone.

It may be advantageously provided if the secondary optical element is configured as part of a sphere with a sphere centre.

It may also be convenient if the secondary optical element is configured as a cone.

It may also be provided if the secondary optical element is configured as part of an ellipsoid.

Apart from the spherical shape and the cone shape other three-dimensional quadrics/partial surfaces of such quadrics are generally feasible as a light coupling-out surface of the secondary optical element, for example cutouts of an ellipsoid.

The spherical surface, the cone surface as well as the partial surface of an ellipsoid however, as a rule, provide the desired advantages.

The objective is to guide the light beams of a light source focused/bunched if possible, onto a reflector/an effective useful region of a reflector provided for generating a light distribution or part of a light distribution, without a reduction in the luminous flux.

The light beams of the light source/light sources enter the primary optical element via the light coupling-in surface and are relayed/deflected by the lateral surface of the primary optical element by means of total reflection onto the light coupling-out surface of the same/to the light coupling-in surface of a secondary optical element.

The light coupling-out surface of the secondary optical element has a reflector arranged downstream of it, which reflects the light deflected by the first light fixture into the desired exit direction.

The light coupling-out surface of the secondary optical element is in this case configured such that all light beams as far as possible are guided onto the useful surface of the reflector, making use of the law of refraction.

Light beams, which for example intersect the sphere centre of the light coupling-out surface of the secondary optical element, are thus not refracted since the light beams are incident as normal on the respective tangents of the passing-through points of the sphere.

Light beams, which subsequently do not intersect the centre of the sphere, are refracted according to the law of refraction during transfer through the light coupling-out surface of the sphere.

Depending on how high the refractive index of the material used for the secondary optical element is in comparison to the refractive index of the dominant medium outside the secondary optical element, which is usually air, the light beams are refracted to varying degrees.

Based on the law of refraction it is generally true to say that a light beam, when transitioning from one medium into an optically thinner medium, is refracted away from the normal of the respective plane of incidence.

Due to the secondary optical element present in the beam path and shaped for example as part of a sphere, a homogenous light emission cone is generated, which means that the light beams are refracted in such a way that more light beams are incident on the reflector.

It has become evident that the partial surface of a sphere, as light coupling-out surface of the secondary optical element, causes an increase in the luminous flux at the reflector, in contrast to an otherwise normally planar light coupling-out surface.

Furthermore the spherical shape favours a constant luminous flux and a constant light intensity for minor changes in the spherical radius of the light coupling-out surface of the secondary optical element shaped as a spherical surface. As a result the influence from the tolerances occurring during manufacture can be reduced.

It has also become evident that the conical surface as light coupling-out surface of the secondary optical element causes an increase in the luminous flux at the reflector, in contrast to an otherwise normally planar light coupling-out surface.

It has also become evident that the partial surface of an ellipsoid as light coupling-out surface of the secondary optical element causes an increase in the luminous flux at the reflector, in contrast to an otherwise normally planar light coupling-out surface.

In a practice-oriented embodiment it may be provided that the reflecting lateral surface of the primary optical element comprises a parabolically shaped region with a focal point, wherein the parabolically shaped region allows the light beams entering through the light coupling-in surface of the primary optical element to be deflected in direction of the light coupling-out surface of the primary optical element.

It may be advantageously provided that the focal point of the parabolically shaped region of the primary optical element and the centre of the sphere lie in one point.

The secondary optical element formed as part of a sphere in such an embodiment additionally functions as an equalising element, in order to guide light beams, which for example due to inevitable tolerances, when reflected at the parabolically shaped region of the primary optical element, do not pass through the focal point of the parabolically shaped region, are refracted in such a way by the spherically shaped light coupling-out surface of the secondary optical element that the light beams are guided onto the effective useful region of the reflector/generally onto the reflector.

With a further convenient embodiment of the invention it may be provided that the reflecting lateral surface of the primary optical element comprises a hyperbolically shaped region with a real focal point and a virtual focal point, wherein the hyperbolically shaped region allows the light beams entering through the light coupling-in surface of the primary optical element to be deflected in direction of the light coupling-out surface of the primary optical element.

It may be advantageously provided that the real focal point of the hyperbolically shaped region of the primary optical element and the centre of the sphere lie in one point.

Furthermore it may be provided that an add-on optics is arranged in main emission direction of the first light fixture in front of the light coupling-in surface of the primary optical element, which is configured to parallelise the light beams emitted by the first light fixture or to focus them onto one point.

In this context it may be provided that the add-on optics aligns the light beams of the first light fixture in parallel with the optical axis of the parabolically shaped region of the primary optical element, so that the light beams on reflection with the parabolically shaped region are bunched in the focal point of the parabolically shaped region.

"Main emission direction" is understood to mean the direction, in which the first light fixture due to its directional effect emits the strongest/the most light.

The add-on optics may also be configured as a TIR optical body.

In this respect it may be convenient if the add-on optics is arranged to focus the light beams of the first light fixture onto the virtual focal point of the hyperbolically shaped region of the primary optical element.

It may also be provided that the primary optical element and the secondary optical element are firmly bonded to each other, wherein preferably the primary optical element and the secondary optical element are formed in one piece and consist of the same material.

Firmly bonded connections are understood to be all connections, in which the connection partners are held together by atomic or molecular forces. At the same time they are non-releasable connections, which can only be separated by destroying the connection means such as for example soldering, welding, gluing, vulcanising.

Furthermore it may be provided that the add-on optics is firmly bonded to the primary optical element, wherein preferably the add-on optics is formed in one piece with the primary optical element.

Equally it may be provided that the primary optical element and the secondary optical element are made of Tarflon.

Tarflon is a transparent, amorphous material, which has very good temperature and chemical resistance. Tarflon is heat-resistant up to 135° C. and comprises high impact strength, even at low temperatures. Since a motor vehicle, in particular a motor vehicle headlight, may be exposed to very low temperatures in the winter and very high temperatures in the summer, the above mentioned properties are of particular importance for a desired material.

Further it may be provided that the first lighting fixture comprises at least one light source.

It may be provided that the at least one light source is configured as an LED.

It may also be provided that the at least one light source is configured as a laser light source with a light conversion element.

Since laser devices as a rule emit coherent, monochromatic light/light in a narrow wavelength range, but the preferred/legally required emitted light for a motor vehicle headlight is generally white mixed light, so-called light conversion elements for converting the essentially monochromatic light into white/polychromatic light are arranged in emission direction of the laser device, wherein "white light" is understood to mean light of a spectral composition, which is such that in humans this produces the colour impression of "white". This light conversion element is for example configured in the form of one or more photoluminescence converters/photoluminescence elements, wherein incident laser beams of the laser device are incident on the light conversion element comprising, as a rule, photo luminescence dye and stimulate this photo luminescence dye to become photoluminescent, the light conversion element thereby emitting light in a different wavelength/wavelength ranges. The light emission of the light conversion element is essentially characteristic of a Lambertian emitter.

With light conversion elements a difference is made between reflective and transmissive conversion elements.

The terms "reflective" and "transmissive" refer to the blue portion of the converted white light. With a transmissive arrangement the main propagation direction of the blue light portion is essentially rectified relative to the propagation direction of the exiting laser beam, after it has passed through the converter volume/conversion element. With a reflective arrangement the laser beam is reflected/deflected at a boundary surface attributable to the conversion element, so that the blue light portion has a propagation direction different from the laser beam, which, as a rule, is realised as a blue laser beam.

The reflective area of the parabolically/hyperbolically shaped lateral area of the primary optical element may be utilised for introducing disturbances acting as passive safety sensors, for example surface structuring, steps or a hole, which in case of failure prevent or reduce the escape of laser beams of a laser device. The same area may also be used for the placement of active safety sensors.

Further options or extensions of the laser safety concept are for example so-called "beam traps", which take the form of a laser-light-absorbing layer in external contact with the reflection surface of the parabolically/hyperbolically formed area and in case of failure or damage of the light conversion element transmit white mixed light and absorb laser light.

A further example of a laser safety concept are light sensors arranged in safety-relevant positions, which respectively compare light intensities of the light emitted by the laser device and light intensities of the light emitted by the light conversion element at these positions to stored reference intensities of respective beam types measured in error-free operation, wherein in case a previously set permitted deviation is exceeded, the laser device is automatically switched off.

Advantageously it may be provided that the first light fixture is provided for generating a light distribution or a partial light distribution of a first distribution, for example dipped-beam or full-beam.

With an advantageous variant such a lighting device can be used for generating the "dipped-beam" light function, wherein the lighting device, for this "dipped-beam" light function, generates a light distribution, which when the lighting device is installed in a vehicle, generates a dipped-beam distribution which is in compliance with legal requirements in front of the vehicle.

It may be provided that such a lighting device can be used for generating the "full-beam" light function, wherein the lighting device, for this "full-beam" light function, generates a light distribution, which when the lighting device is installed in a vehicle, generates a full-beam distribution which is in compliance with legal requirements in front of the vehicle.

The light functions/light distributions listed above are non-exhaustive, wherein the lighting device can also generate combinations of these light functions and/or only a partial light distribution, i.e. for example only a part of a full-beam, dipped-beam, fog-lamp or daytime-running light distribution.

Preferably it is provided that in case two or more light diodes are provided, each light diode is controlled independently of the other light diodes.

Each light diode can be switched on and off independently of the other light diodes of a light source, and preferably, in case of dimmable light diodes, can also dimmed independently of the other light diodes of the light source.

It may be convenient if the reflector is configured as a free-form reflector.

A free-form reflector is a reflector, the special characteristic of which is that the reflector shape does not correspond to any mathematical standard surface. Free-form reflectors can be used to realise for example an asymmetrical illumination without the otherwise necessary diffusion glass, wherein at the same time the usable light intensity is increased.

Further, it may be provided that the reflector is configured as a parabolic reflector with a focal point.

It may be provided that the focal point of the parabolic reflector and the centre of the sphere lie in one point. Parallelised beams of the ancillary optics must be incident parallel to the optical axis of the parabolically shaped area, in order to be incident on/be deflected to the focal point of the parabolically shaped area.

Further, it may be provided that the reflector is configured as a hyperbolic reflector with a focal point.

It may be provided that the focal point of the hyperbolic reflector and the centre of the sphere lie in one point.

It may be provided that a motor vehicle headlight comprises at least one lighting device.

It may be provided that the motor vehicle headlight further comprises a second light fixture for generating a light distribution or a partial light distribution of a second light function, for example dipped-beam or full-beam.

Advantageously the second light fixture may comprise at least one light source.

It may be convenient if at least one light source is configured as an LED or a laser light source with a light conversion element.

Advantageously it is provided that the first and the second light fixture are arranged on a common printed circuit board.

Advantageously the light fixtures, which are respectively provided for different light functions, such as a dipped-beam function and a full-beam function, and can be controlled independently of each other, are arranged on a common printed circuit board.

This approach, as a rule, has a space-saving effect for a motor vehicle headlight, wherein care must now be taken that both light functions can be generated separately and/or jointly without any mutual influence in front of the motor vehicle.

Figure 2:
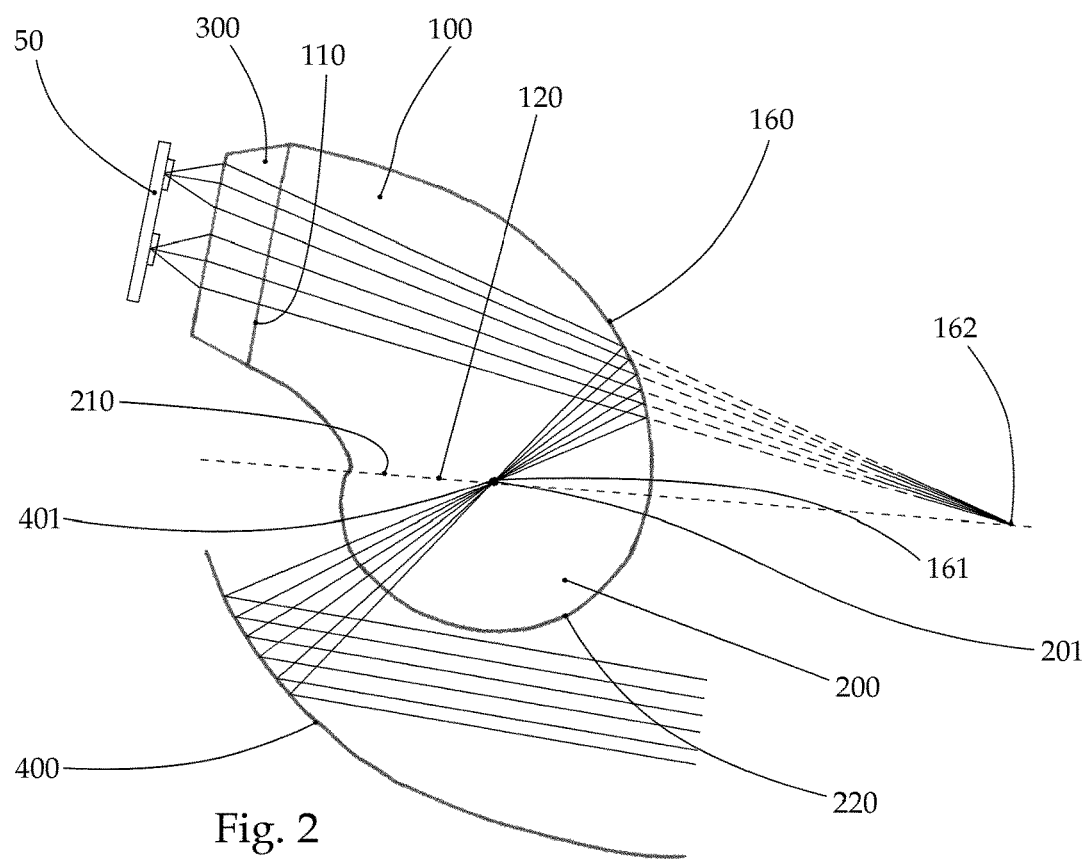
Figure 3:
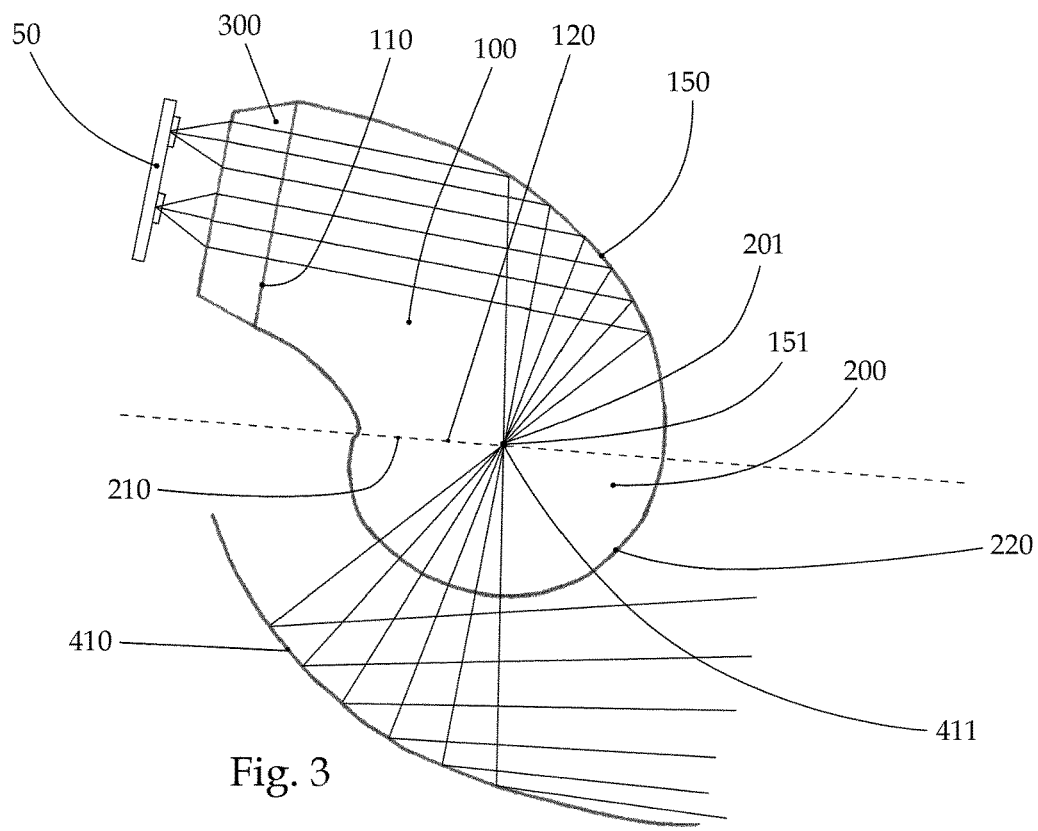
Figure 4:
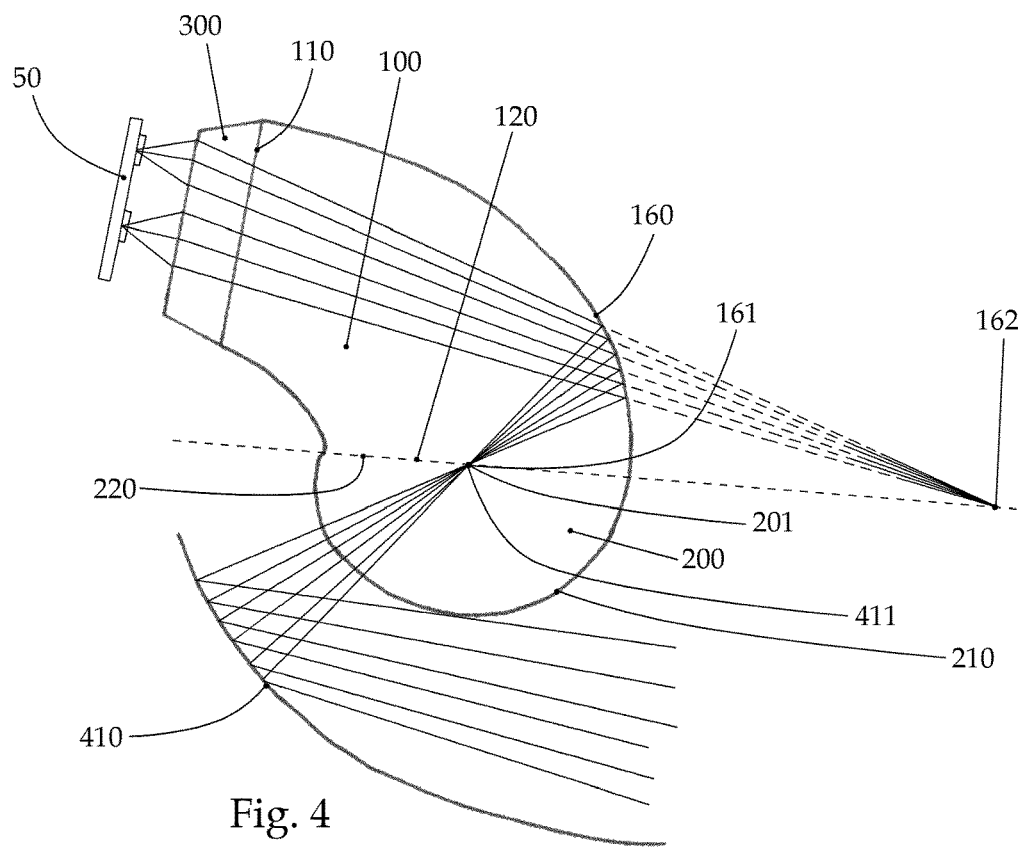
Figure 5:
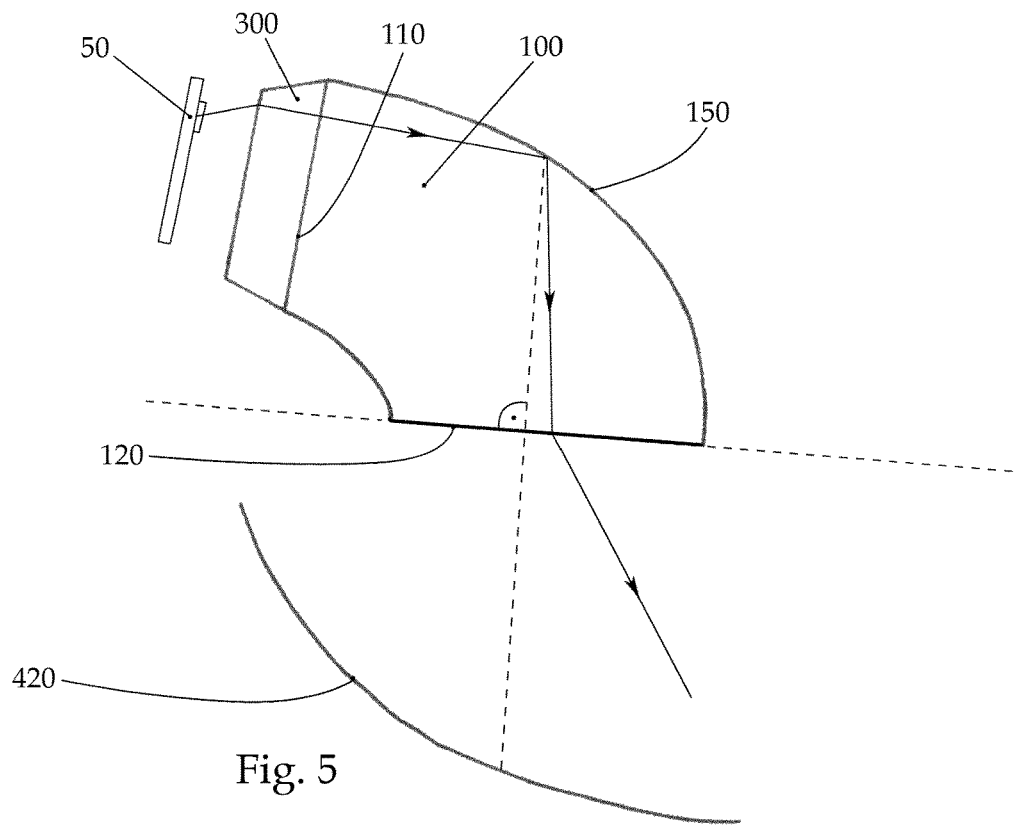
Figure 6:
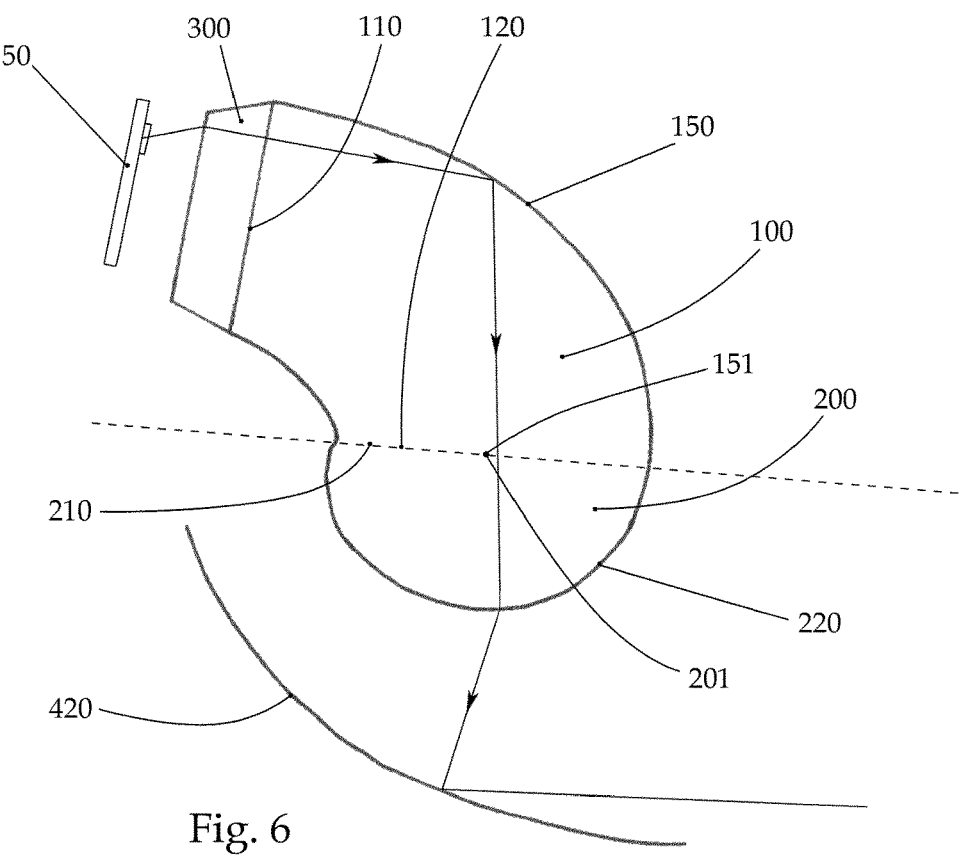
Figure 7:
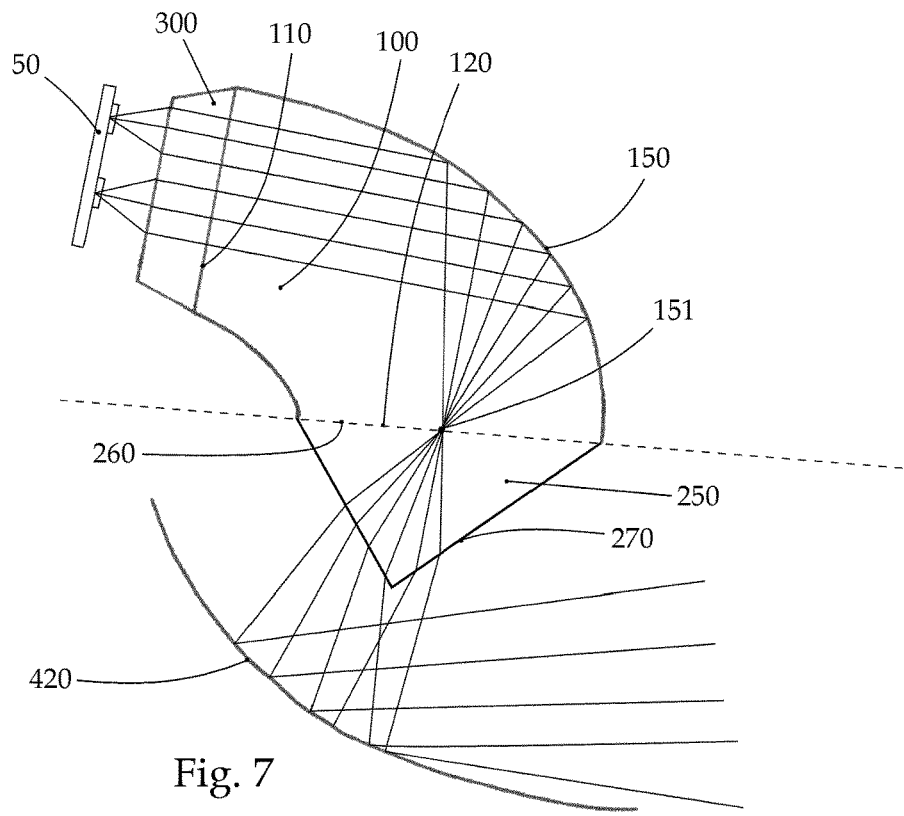
Figure 8:
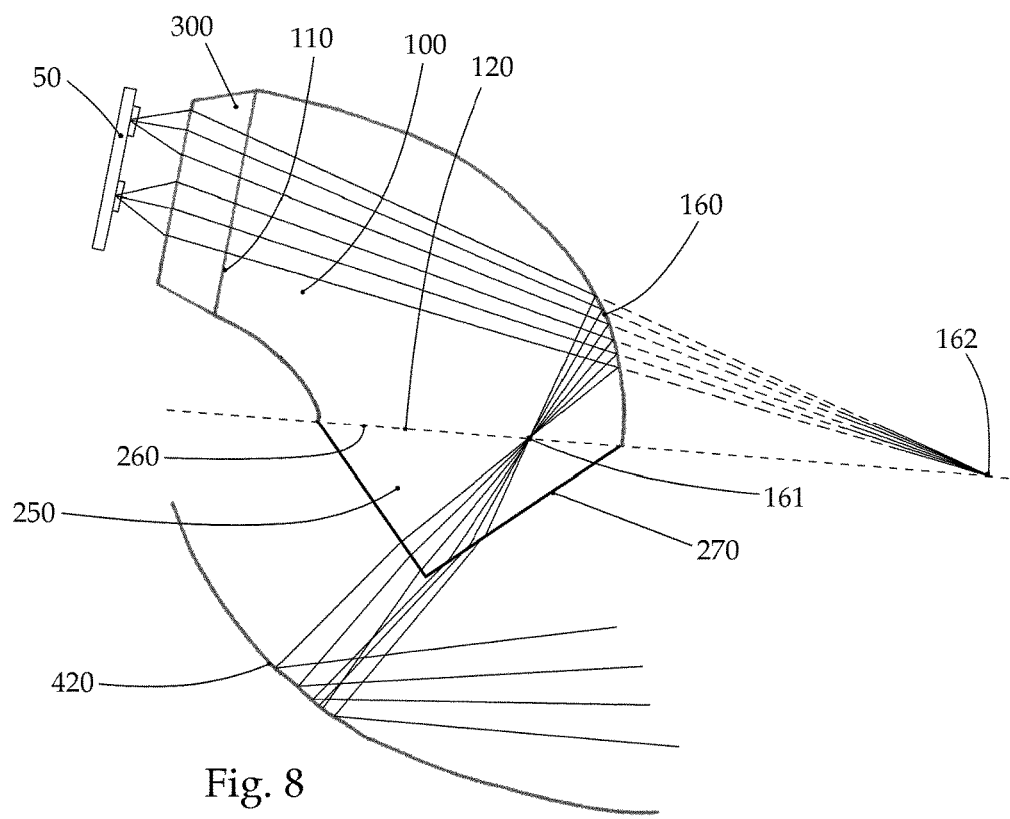
Figure 9:
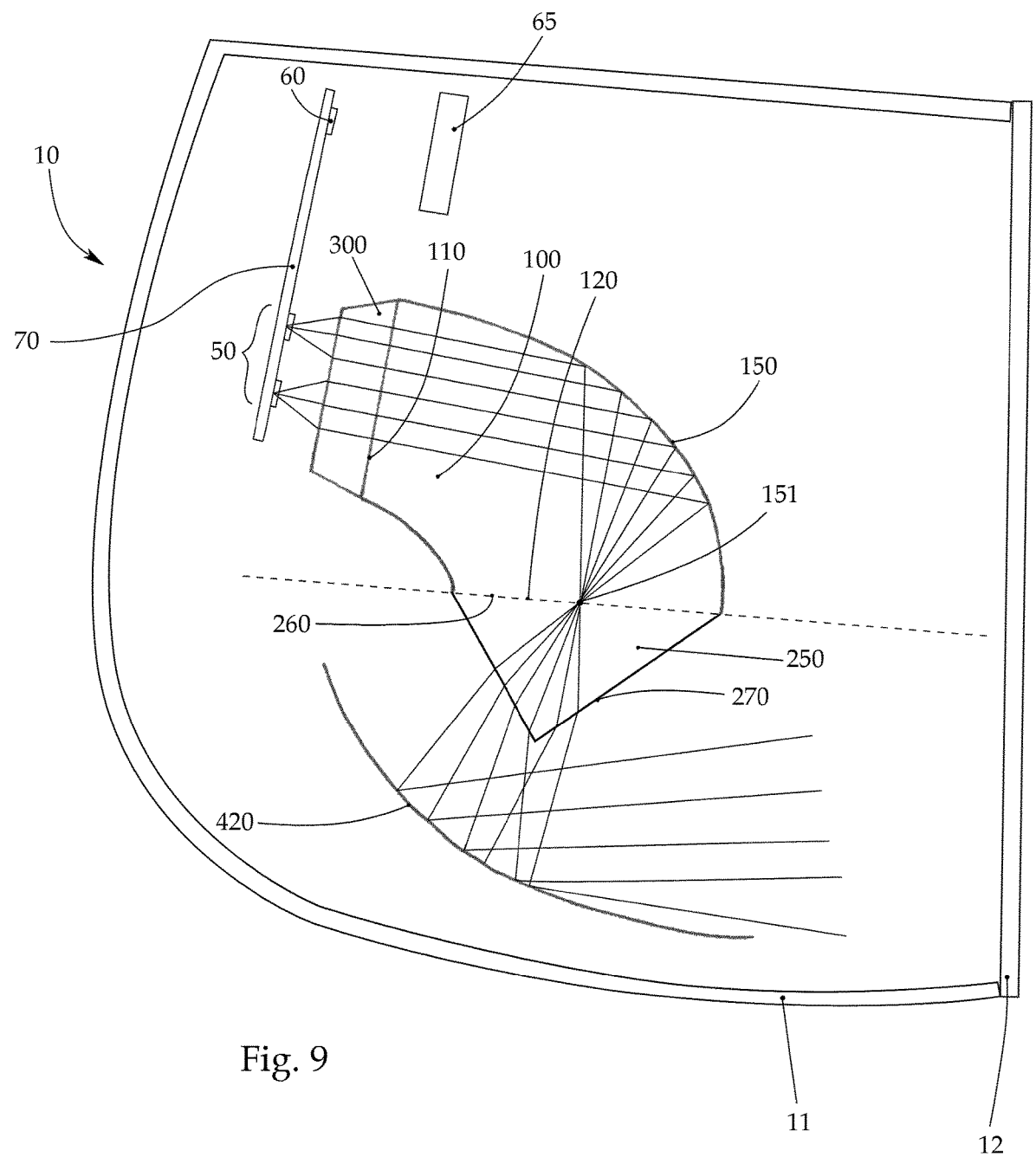
Figure 10:
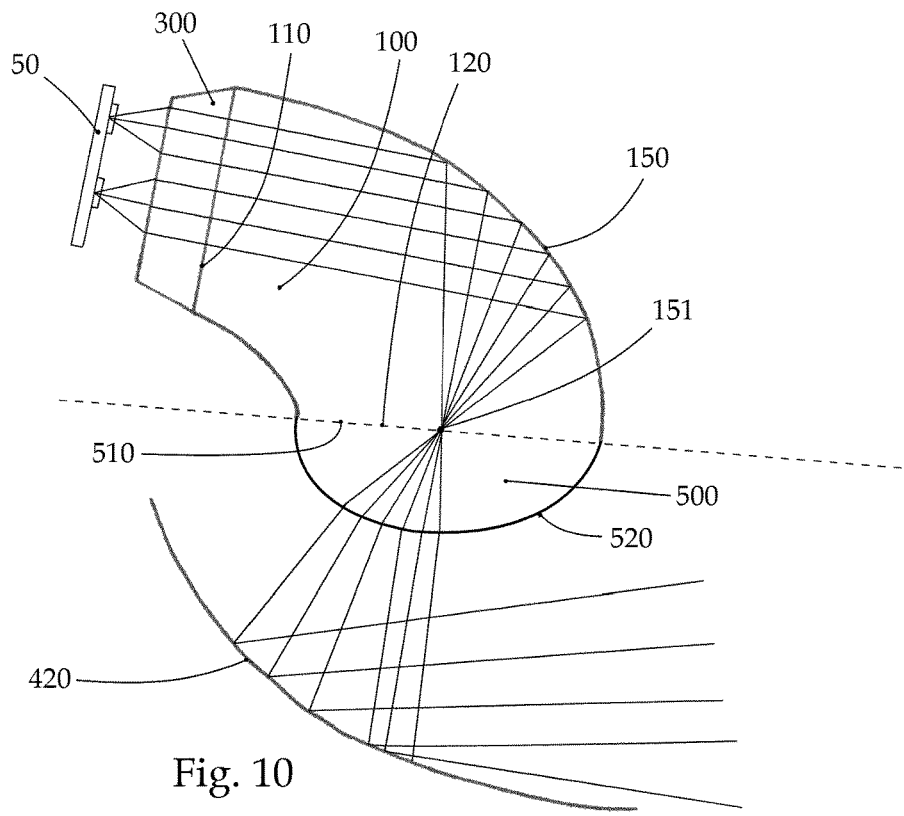
Figure 11:
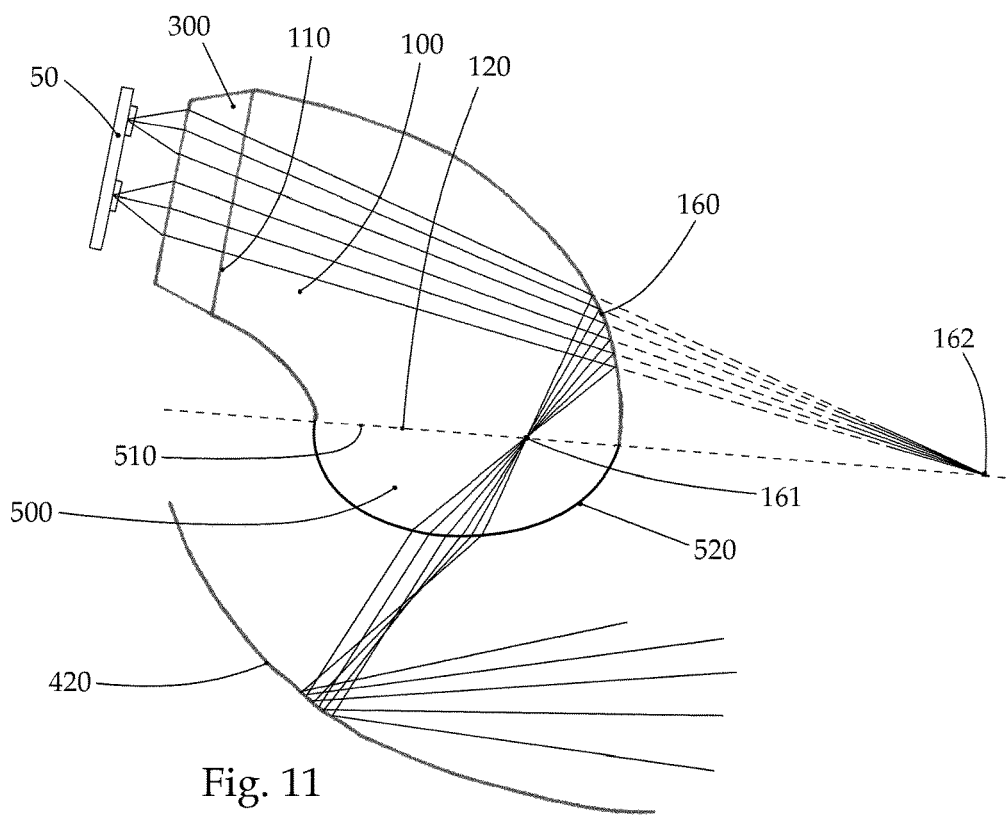

The invention will now be explained in detail hereunder by way of exemplary drawings, in which FIG. 1 shows an exemplary lighting device with a primary and a secondary optical element and a parabolic reflector, wherein the secondary optical element is shaped as part of a sphere and the primary optical element comprises a parabolically shaped area, FIG. 2 shows a further example of a lighting device with a parabolic reflector, wherein the primary optical element comprises a hyperbolically shaped area, FIG. 3 shows a further example of a lighting device with a hyperbolic reflector, wherein the primary optical element comprises a parabolically shaped area, FIG. 4 shows a further example of a lighting device with a hyperbolic reflector, wherein the primary optical element comprises a hyperbolically shaped area, FIG. 5 shows a lighting device according to the state of the art with a planar light coupling-out surf and an exemplary beam path, FIG. 6 shows an exemplary beam path through an exemplary lighting device, FIG. 7 shows a further example of a lighting device with a free-form reflector, wherein the secondary optics is formed as a cone and the primary optical element comprises a parabolically shaped area, FIG. 8 shows a further exemplary lighting device with a free-form reflector, wherein the secondary optical element is formed as a cone and the primary optical element comprises a hyperbolically shaped area, FIG. 9 schematically shows a motor vehicle headlight with a lighting device and a second light fixture, FIG. 10 shows a further example of a lighting device with a free-form reflector, wherein the secondary optics is configured as part of an ellipsoid and the primary optical element comprises a parabolically shaped area, FIG. 11 shows a further example of a lighting device with a free-form reflector, wherein the secondary optics is configured as part of an ellipsoid and the primary optical element comprises a hyperbolically shaped area.

FIG. 1 shows a light-conducting primary optical element 100 arranged in main emission direction of a first light fixture 50, which comprises a light coupling-in surface 110 for coupling light into the primary optical element 100 on a first side facing the first light fixture 50, a light coupling-out surface 120 on a side facing away from the first light fixture 50 as well as a lateral surface extending between the light coupling-in surface 110 and the light coupling-out surface 120, the lateral surface being provided for relaying the coupled-in light through total reflection in direction of the light coupling-out surface 120 of the primary optical element.

"Main emission direction" is understood to mean that direction, in which the first light fixture, due to its directional effect, emits the strongest/the most light.

The reflecting lateral surface of the primary optical element 100 comprises a parabolically shaped area 150 with a focal point 151, wherein the parabolically shaped area 150 permits deflection of the light beams entering through the light coupling-in surface 110 of the primary optical element 100 in direction of the light coupling-out surface 120 of the primary optical element 100.

In main emission direction of the first light fixture 50, which in FIG. 1 comprises two light sources in the form of LEDs, an ancillary optics 300 is arranged in front of the light coupling-in surface 110 of the primary optical element 100, which is arranged to parallelise or focus the light beams emitted by the first light fixture 50.

In the example of FIG. 1 the light beams of the first light fixture 50 are parallelised/collimated and thus guided onto the parabolically shaped area 150 of the primary optical element 100 in such a way that the light beams, following reflection at the parabolically shaped area 150, are bunched in the focal point 151 of the parabolically shaped area 150/intersect the focal point.

Further, a secondary optical element 200 is arranged in light emission direction downstream of the light coupling-out surface of the primary optical element 100, wherein the secondary optical element 200, on a side facing the light coupling-out surface 120 of the primary optical element 100, comprises a light coupling-in surface 210 and on a side facing away from the primary optical element 100, a light coupling-out surface 220.

The secondary optical element in FIG. 1 is configured as part of a sphere with a sphere centre 201, wherein the focal point 151 of the parabolically shaped area 150 of the primary optical element 100 and the sphere centre 201 coincide with each other.

In the examples depicted both the primary optical element 100 and the secondary optical element 200 are manufactured from a material, the refractive index of which is higher than the refractive index of the surrounding medium of the primary optical element 100/the secondary optical element 200, for example air.

Moreover, the primary optical element 100 and the secondary optical element 200 are firmly bonded to each other, wherein the primary optical element 100 and the secondary optical element 200 preferably form one piece, i.e. are manufactured in one piece and consist of the same material, preferably Tarflon, which means that the light coupling-in surface 120 of the primary optical element 100 and the light coupling-in surface 210 of the secondary optical element 200 lie in an imaginary plane.

Further, as shown in the examples depicted in the figures, it may be provided that the ancillary optics 300 is firmly bonded to the primary optical element 100, wherein preferably the ancillary optics 300 is formed in one piece with the primary optical element 100.

Further, a parabolically formed reflector 400 with a focal point 401 is arranged in light emission direction after the light coupling-out surface 220 of the secondary optical element 200, wherein the focal point 401 of the reflector 400 and the sphere centre 201 lie in one point, which means that the sphere centre 201, the focal point 151 of the parabolically shaped area 150 of the primary optical element 100 and the focal point 401 of the parabolic reflector 400 lie in one point/coincide with one another.

The reflector in this case generates a light distribution or a partial light distribution of a light function, for example a dipped-beam function/dipped-beam distribution or a full-beam function/full-beam distribution. Preferably the lighting device is installed in a motor vehicle headlight/as a motor vehicle headlight in a motor vehicle, wherein the lighting device generates/maps the above-mentioned light functions/light distributions in front of the motor vehicle, in particular in driving direction of the motor vehicle.

This applies generally to the actual lighting device as well as to the exemplary embodiments described hereunder.

The term "driving direction" in this context denotes the direction, in which a driven motor vehicle is moving, as constructionally provided. A technically possible reversing is, in this context, not defined as driving direction.

The above-mentioned listed light functions/light distributions are not exhaustive, wherein the lighting device can also generate combinations of these light functions/light distributions and/or generates only one partial light distribution, for example only a part of a full-beam or dipped-beam light function/light distribution.

It should be noted that the lighting device does not comprise any optical lenses for generating such light functions/light distributions.

FIG. 1 also shows exemplary beam paths, which do not undergo any deflections through partially spherical secondary optical elements 200, since the beam paths depicted pass through the focal point 151 of the parabolically shaped area 150 and thus also pass through the sphere centre 201.

FIG. 2 shows a further exemplary embodiment, wherein in contrast to the example in FIG. 1 the reflecting lateral surface of the primary optical element 100 comprises a hyperbolically shaped area 160 with a focal point 161 and a virtual focal point 162. The hyperbolically shaped area 160 permits a deflection of the light beams entering through the light coupling-out surface 110 of the primary optical element 100 in direction of the light coupling-out surface 120 of the primary optical element 100.

Similarly to FIG. 1 the focal point 161 of the hyperbolically shaped area 160 of the primary optical element 100 and the sphere centre 201 of the secondary optical element 200 lie in one point. Further in FIG. 2 the focal point 401 of the parabolic reflector 400 and the sphere centre 201 also lie in one point.

The ancillary optics 300 shown in FIG. 2, in contrast to the example in FIG. 1, is arranged to focus/bunch the light beams of the first light fixture 50 in the virtual focal point 162 of the hyperbolically shaped area 160 of the primary optical element 100, wherein the light beams after reflection at the hyperbolically shaped area 160 are bunched in the focal point 161 of the hyperbolically shaped area 160/intersect the same.

FIG. 3 shows the example of FIG. 1, wherein instead of the parabolic reflector 400 a hyperbolic reflector 410 with a focal point 411 is provided.

FIG. 4 shows the example of FIG. 2, wherein instead of the parabolic reflector 400 a hyperbolic reflector 410 with a focal point 411 is provided.

FIG. 5 shows a primary optical element 100 with a light coupling-in surface 110 and a planar light coupling-out surface 120 as well as a reflector arranged in light emission direction after the light coupling-out surface 120 of the primary optical element 100. In contrast to the exemplary embodiments of FIGS. 1, 2, 3 and 4 a secondary optical element 200 is missing in FIG. 5. Furthermore a possible beam path has been plotted in FIG. 5, which is to illustrate that light beams, during transition from the primary optical element 100 into the surrounding medium, are refracted with a lower refractive index according to the law of refraction at the planar light coupling-out surface 120 of the primary optical element 100 such that these are refracted away from the normal also depicted in FIG. 5, and that as a result depending on the respectively used reflector fewer light beams are allowed to be incident on an effective useful surface of the respective reflector.

FIG. 6 essentially shows the exemplary embodiments from the previous figures, wherein the exemplary beam path plotted in FIG. 6 shall demonstrate, how light beams, during transition from the secondary optical element 200 into the surrounding medium, are refracted with a lower refractive index at the light coupling-out surface 220 of the secondary optical element 200 compared to the beam path from the previous FIG. 5. In this context it is irrelevant as to whether the reflecting area of the lateral surface of the primary optical element 100 comprises a parabolically or hyperbolically shaped area.

In contrast to the depicted examples in FIGS. 1, 2, 3 and 4 an exemplary beam path is shown, which after reflection at the lateral surface of the primary optical element does not pass through the respective focal point 151, 161/the sphere centre 201, wherein the respective focal point is dependent on whether the primary optical element comprises a parabolically or hyperbolically shaped area 150, 160.

Due to the light coupling-out surface 220 of the secondary optical element 200 configured as part of a spherical surface the same exemplary light beam of FIG. 5 is refracted on the effective useful surface of a reflector arranged downstream when viewed in light emission direction.

It is pointed out that the lighting device shown in FIG. 5 does not represent an example according to the invention.

FIG. 7 shows a further exemplary embodiment, wherein in contrast to the example in the previous figures the secondary element 250 is configured as a cone with a cone base surface and the reflector is configured as a free-form reflector 420. The centre of the cone base surface, which at the same time represents the light coupling-in surface 260 of the secondary optical element configured as a cone, can advantageously be arranged in such a way that it coincides with the focal point 151 of the parabolically shaped area 150. The lateral surface of the cone 250 represents the light coupling-out surface 270 of the secondary optical element 250.

A free-form reflector is a reflector the particular property of which consists in that the reflector shape does not correspond to a mathematical standard surface.

The primary optical element 100, in the example shown in in FIG. 7, comprises a parabolically shaped area 150 with a focal point 151, wherein the ancillary optics 300 parallelises/collimates the light beams of the first light fixture 50 and guides them onto the parabolically shaped area 150 of the primary optical element 100 in such a way that the light beams, after reflection at the parabolically shaped area 150, are bunched in the focal point 151 of the parabolically or hyperbolically shaped area 150/intersect the focal point 151.

FIG. 8 shows a further exemplary embodiment, wherein in contrast to the previous example of FIG. 7 the reflecting lateral surface of the primary optical element 100 comprises a hyperbolically shaped area 160 with a real focal point 161 and a virtual focal point 162 and the shown ancillary optics 300 is arranged to focus/to bunch the light beams of the first light fixture 50 in the virtual focal point 162 of the hyperbolically shaped area 160 of the primary optical element 100, wherein the light beams after reflection at the hyperbolically shaped area 160 are bunched in the focal point 161 of the hyperbolically shaped area 160/intersect the same. The centre of the cone base surface does, in this example, not coincide with the focal point 161 of the hyperbolically shaped area 160, wherein again, it can be provided here that the centre of the cone base surface coincides with the focal point 161 of the hyperbolically shaped area.

The light beams/beam paths illustrated in FIGS. 7 and 8 show that the light beams—compared to a planar coupling-out surface 120—are better bunched/more concentrated because of the secondary optical element 250 when incident onto an effective useful area of the free-form reflector 420.

FIG. 9 shows a motor vehicle headlight 10 with a housing 11 and a cover glass 12 not functioning as an optical lens, wherein a lighting device is arranged in the motor vehicle headlight 10.

The lighting device, as in the previous examples, comprises a first light fixture 50, which is provided for generating a light distribution or partial light distribution of a first light function such as dipped-beam or full-beam, wherein the light beams emitted by the first light fixture 50 and passing through a collimator 100 are incident in parallel on a parabolically shaped lateral area 150 of a primary optical element 100 with a focal point 151.

The parabolically shaped area 150 permits a deflection of the incident light beams in direction of a light coupling-out surface 120 of the primary optical element 100. In light emission direction a light coupling-in surface 260 of a secondary optical element 250 is arranged after the light coupling-out surface 120 of the primary optical element 100, wherein the secondary optical element 250 in the example of FIG. 9, is configured as a cone with a cone base surface. The centre of the cone base surface can, as mentioned in the previous exemplary embodiments, coincide with the focal point 151 of the primary optical element 100.

A discussion of the beam patterns as regards the first light fixture 50 has already taken place in the previous examples and should be referred to in conjunction with the exemplary embodiment in FIG. 9.

The motor vehicle headlight 10 in FIG. 9 further comprises a second light fixture 60, which is realised as an LED in FIG. 9 and is provided for generating a light distribution or partial light distribution of a second light function such as dipped-beam or full-beam, wherein the first and the second light fixture 50, 60 are arranged on a common printed circuit board 70. As regards completeness a light-forming optics 65 is arranged in main emission direction after the second light fixture 60, which may for example be configured as a lens or as a reflector. For reasons of clarity possible beam paths starting from the second light fixture 60 were omitted.

In this way it is possible to arrange/install the light fixtures 50, 60, which are each provided for generating different light functions such as dipped-beam and full-beam, on a common printed circuit board.

This approach, as a rule, has a space-saving effect on a motor vehicle headlight, wherein it must be ensured that both light functions can be generated separately and/or jointly without influencing each other in front of the motor vehicle, wherein the primary optical element 100, the secondary optical element 200 and, as required, the ancillary optics 300 serve, as it were, as deflecting optics.

Furthermore the light fixtures 50, 60 may be controllable and dimmable independently of each other.

FIG. 10 and FIG. 11 each show further lighting devices, wherein the layout of the lighting devices in FIG. 10 and FIG. 11 is essentially the same as in the examples of FIG. 7 and FIG. 8, whereas the secondary element 500 in FIGS. 10 and 11 is formed as part of an ellipsoid.

The embodiment in FIG. 10 further shows a first light fixture as well as a primary optical element 100 with a parabolically shaped area 150, wherein the light beams of the first light fixture 50 are incident on the parabolically shaped area 150 and are deflected as a bundle in a focal point 151 of the parabolically shaped area 150/intersect this focal point 151. The focal point 151 preferably lies in a light coupling-in surface 510 of the secondary optical element 500 configured as part of an ellipsoid, wherein the light beams hit a free-form reflector 420 via a light coupling-out surface 520 of the secondary optical element 500.

The embodiment in FIG. 11 further shows a first light fixture 50 as well as a primary optical element 100 with a hyperbolically shaped area 160, wherein the light beams of the first light fixture 50 are incident on the hyperbolically shaped area 160 and are deflected as a bundle in a real focal point 161 of the parabolically shaped area 160/intersect this real focal point 161. The focal point 161 preferably lies in a light coupling-in surface 510 of the secondary optical element 500 configured as part of an ellipsoid, wherein the light beams are incident on a free-form reflector 420 via a light coupling-out surface 520 of the secondary optical element 500.

For a more accurate analysis of the respective beam paths please refer to the previous examples and the respectively made statements.

Furthermore it is pointed out that the examples/embodiments shown in the figures disclose a non-exhaustive number of examples and their combination options, wherein it may also be provided that a free-form reflector may be arranged for the examples in the FIGS. 1, 2, 3, 4, 5 and 6.

Similarly, apart from the shown exemplary embodiment of FIG. 9, the other examples disclosed—including combinations thereof—may be arranged in a motor vehicle headlight.

LIST OF REFERENCE SYMBOLS

Motor vehicle headlight . . . 10
Headlight housing . . . 11
Cover glass . . . 12
First light fixture . . . 50
Second light fixture . . . 60
Light-forming optics . . . 65
Printed circuit board . . . 70
Primary optical element . . . 100
Light coupling-in surface (PO) . . . 110
Light coupling-out surface (PO) . . . 120
Parallel-shaped area . . . 150
Focal point—par. shaped area . . . 151
Hyperbolically shaped area . . . 160
Focal point—hyp. shaped area . . . 161
Virtual focal point—hyp. shaped area . . . 162
Secondary optical element (sphere) . . . 200
Centre of sphere . . . 201
Light coupling-in surface (SO sphere) . . . 210
Light coupling-out surface (SO sphere) . . . 220
Ancillary optics . . . 300
Hyperbolic reflector . . . 400
Focal point—hyp. reflector . . . 401
Parabolic reflector . . . 410
Focal point—par. reflector . . . 411
Free-form reflector . . . 420
Secondary optical element (ellipsoid) . . . 500
Light coupling-in surface (SO ellip.) . . . 510
Light coupling-out surface (SO ellip.) . . . 520

The invention claimed is:

1. A lighting device for a motor vehicle headlight comprising:
a light-guiding primary optical element (100), which is arranged in main emission direction of a first light fixture (50) and which, on a side facing the first light fixture (50), has a light coupling-in surface (110) for coupling light beams into the primary optical element (100), a light coupling-out surface (120) on a side facing away from the first light fixture (50) as well as a lateral surface extending between the light coupling-in surface (110) and the light coupling-out surface (120), on which the coupled-in light can be relayed through total reflection in direction of the light coupling-out surface (120) of the primary optical element (100),
a secondary optical element (200, 250, 500) arranged in light emission direction after the light coupling-out surface (120) of the primary optical element (100), which comprises a light coupling-in surface (210, 260, 510) on a side facing the light coupling-out surface (120) of the primary optical element (100) and a light coupling-out surface (220, 270, 520) on a side facing away from the primary optical element (100), which light coupling-out surface is shaped convexly, and
a reflector (400, 410, 420) arranged in light emission direction after the light coupling-out surface (220, 270, 520) of the secondary optical element (200, 250, 500) and provided for generating a light distribution or a partial light distribution of a light function,
wherein the secondary optical element (200, 250, 500) is designed as part of a quadric, wherein the secondary optical element (200, 250, 500) is arranged to guide the light beams emitted by the first light fixture (50) and reaching the light coupling-out surface (220, 270, 520) of the secondary optical element (200, 250, 500), onto the reflector (400, 410, 420) during coupling-out by means of refraction or to let them pass without a change in direction, and wherein an ancillary optics (300) is arranged in main emission direction of the first light fixture (50) in front of the light coupling-in surface (110) of the primary optical element (100), the ancillary optics being arranged to parallelise or focus the light beams emitted by the first light fixture (50) onto one point.

2. The lighting device according to claim 1, wherein the secondary optical element (200) is shaped as part of a sphere with a sphere centre (201) or as a cone or as part of an ellipsoid.

3. The device according to claim 1, wherein the reflecting lateral surface of the primary optical element (100) comprises a parabolically shaped area (150) with a focal point (151), wherein the parabolically shaped area (150) permits deflection of the light beams entering through the light coupling-in surface (110) of the primary optical element (100) in direction of the light coupling-out surface (120) of the primary optical element (100).

4. The device according to claim 3, wherein the focal point (151) of the parabolically shaped area (150) of the primary optical element (100) and the sphere centre (201) lie in one point.

5. The device according to claim 1, wherein the reflecting lateral surface of the primary optical element (100) comprises a hyperbolically shaped area (160) with a focal point (161) and a virtual focal point (162), wherein the hyperbolically shaped area (160) permits deflecting the light beams entering through the light coupling-out surface (110) of the primary optical element (100) in direction of the light coupling-out surface (120) of the primary optical element (100).

6. The device according to claim 5, wherein the focal point (161) of the hyperbolically shaped area (160) of the primary optical element (100) and the sphere centre (201) lie in one point.

7. The device according to claim 1, wherein the ancillary optics (300) is arranged to focus the light beams of the first light fixture (50) in a virtual focal point (162) of the hyperbolically shaped area (160) of the primary optical element (100).

8. The device according to claim 1, wherein the primary optical element (100) and the secondary optical element (200, 250, 500) are firmly bonded to each other, wherein preferably the primary optical element (100) and the secondary optical element (200, 250, 500) are formed in one piece and consist of the same material.

9. The device according to claim 8, wherein the ancillary optics (300) is firmly bonded to the primary optical element (100), wherein the ancillary optics (300) is formed in one piece with the primary optical element (100).

10. The device according to claim 1, wherein the primary optical element (100) and the secondary optical element (200, 250, 500) are made of Tarflon.

11. The device according to claim 1, wherein the first light fixture (50) comprises at least one light source, wherein the at least one light source is configured as an LED or as a laser light source with a light conversion element.

12. The device according to claim 1, wherein the first light fixture (50) is provided for generating a light distribution or a partial light distribution of a light function such as dipped-beam or full-beam.

13. The device according to claim 1, wherein the reflector is configured as a free-form reflector (420).

14. The device according to claim 1, wherein the reflector is configured as a parabolic reflector (400) with a focal point (401).

15. The device according to claim 1, wherein the focal point (401) of the parabolic reflector (400) and the sphere centre lie in one point.

16. The device according to claim 1, wherein the reflector is configured as a hyperbolic reflector (410) with a focal point (411).

17. The device according to claim 16, wherein the focal point (411) of the hyperbolic reflector (410) and the sphere centre (201) lie in one point.

18. A motor vehicle headlight (10) with at least one lighting device according to claim 1.

19. The motor vehicle headlight according to claim 18, wherein the motor vehicle headlight (10) further comprises a second light fixture (60) for generating a light distribution or a partial light distribution of a second light function such as dipped-beam or full-beam, wherein the second light fixture (60) comprises at least one light source, wherein in particular the at least one light source is configured as an LED or as a laser light source with a light conversion element.

20. The motor vehicle headlight according to claim 19, wherein the first and the second light fixtures (50, 60) are arranged on a common printed circuit board (70).

* * * * *